(12) United States Patent
Leconte et al.

(10) Patent No.: US 8,526,317 B2
(45) Date of Patent: Sep. 3, 2013

(54) METHODS AND APPARATUS FOR PREEMPTIVE BACKOFF FOR MEDIUM ACCESS IN WIRELESS PEER-TO-PEER NETWORKS

(75) Inventors: Mathieu Leconte, Courbevoie (FR); Xinzhou Wu, Monmouth Junction, NJ (US); Rayadurgam Srikant, Urbana, IL (US); Sundar Subramanian, Somerville, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 12/788,487

(22) Filed: May 27, 2010

(65) Prior Publication Data

US 2011/0292817 A1 Dec. 1, 2011

(51) Int. Cl.
*G01R 31/08* (2006.01)
(52) U.S. Cl.
USPC ........................................ 370/252; 370/395.4
(58) Field of Classification Search
USPC .............................................. 370/252, 395.4
See application file for complete search history.

(56) References Cited

U.S. PATENT DOCUMENTS

| | | | |
|---|---|---|---|
| 7,535,919 B2 | 5/2009 | Cho et al. | |
| 2004/0230638 A1* | 11/2004 | Balachandran et al. | 709/200 |
| 2007/0104215 A1* | 5/2007 | Wang et al. | 370/458 |
| 2009/0028119 A1* | 1/2009 | Avidor et al. | 370/338 |
| 2009/0109850 A1 | 4/2009 | Li et al. | |
| 2009/0196174 A1 | 8/2009 | Ji | |
| 2009/0257351 A1 | 10/2009 | Hande et al. | |
| 2009/0323611 A1 | 12/2009 | Singh et al. | |
| 2009/0323665 A1 | 12/2009 | Li et al. | |

OTHER PUBLICATIONS

International Search Report & Written Opinion—PCT/US2011/038263, International Search Authority—European Patent Office—Sep. 29, 2009.
Orestis Tsigkas et al: "An Adaptive Mechanism for High Efficiency and Fairness in IEEE 802.11 Wireless Lans", IEEE International Symposium on Personal, Indoor and Mobile Radio Communications. PIMRC, IEEE; PI, XX, Sep. 1, 2007, pp. 1-5, XP03116814.

* cited by examiner

*Primary Examiner* — Sai-Ming Chan
(74) *Attorney, Agent, or Firm* — James K. O'Hare

(57) ABSTRACT

A method of operating a wireless device is provided in which a number of neighboring nodes is estimated, a medium access priority to access a communication resource in a current timeslot is determined, and whether to transmit a scheduling control signal in the current timeslot is determined based on the number of neighboring nodes and the medium access priority.

52 Claims, 10 Drawing Sheets

METHODS AND APPARATUS FOR PREEMPTIVE BACKOFF FOR MEDIUM ACCESS IN WIRELESS PEER-TO-PEER NETWORKS

BACKGROUND

1. Field

The present disclosure relates generally to communication systems, and more particularly, to preemptive backoff for medium access in wireless peer-to-peer networks.

2. Background

In a wireless peer-to-peer network, a first link that has low priority may yield medium access to a second link with a higher priority and the second link may itself yield to a third link with an even higher priority. If the first and second links yield medium access based on priority, only the third link would then have medium access. However, had the second link yielded only, the first and third links may have been able communicate at the same time without interference. Such a problem is called the "cascade yielding problem." As described, the cascade yielding problem can cause inefficiencies in the network. As such, there is a need to address the cascade yielding problem.

SUMMARY

In an aspect of the disclosure, a method of operating a wireless device is provided in which a number of neighboring nodes is estimated, a medium access priority to access a communication resource in a current timeslot is determined, and whether to transmit a scheduling control signal in the current timeslot is determined based on the number of neighboring nodes and the medium access priority.

In an aspect of the disclosure, an apparatus for wireless communication includes means for estimating a number of neighboring nodes, means for determining a medium access priority to access a communication resource in a current timeslot, and means for determining whether to transmit a scheduling control signal in the current timeslot based on the number of neighboring nodes and the medium access priority.

In an aspect of the disclosure, a computer program product in a wireless device includes a computer-readable medium. The computer-readable medium includes code for estimating a number of neighboring nodes, code for determining a medium access priority to access a communication resource in a current timeslot, and code for determining whether to transmit a scheduling control signal in the current timeslot based on the number of neighboring nodes and the medium access priority.

In an aspect of the disclosure, an apparatus for wireless communication includes a processing system. The processing system is configured to estimate a number of neighboring nodes, to determine a medium access priority to access a communication resource in a current timeslot, and to determine whether to transmit a scheduling control signal in the current timeslot based on the number of neighboring nodes and the medium access priority.

DETAILED DESCRIPTION

Figure 1:
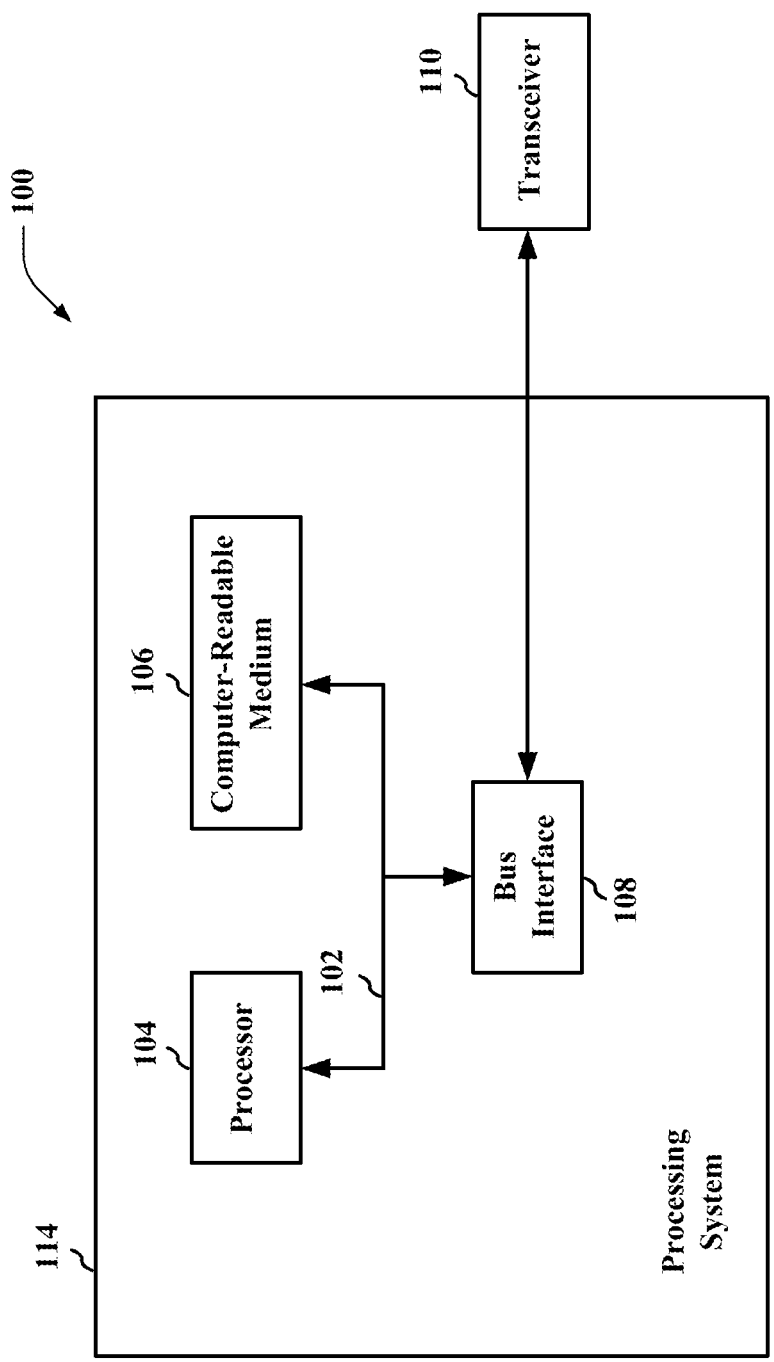
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), a random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
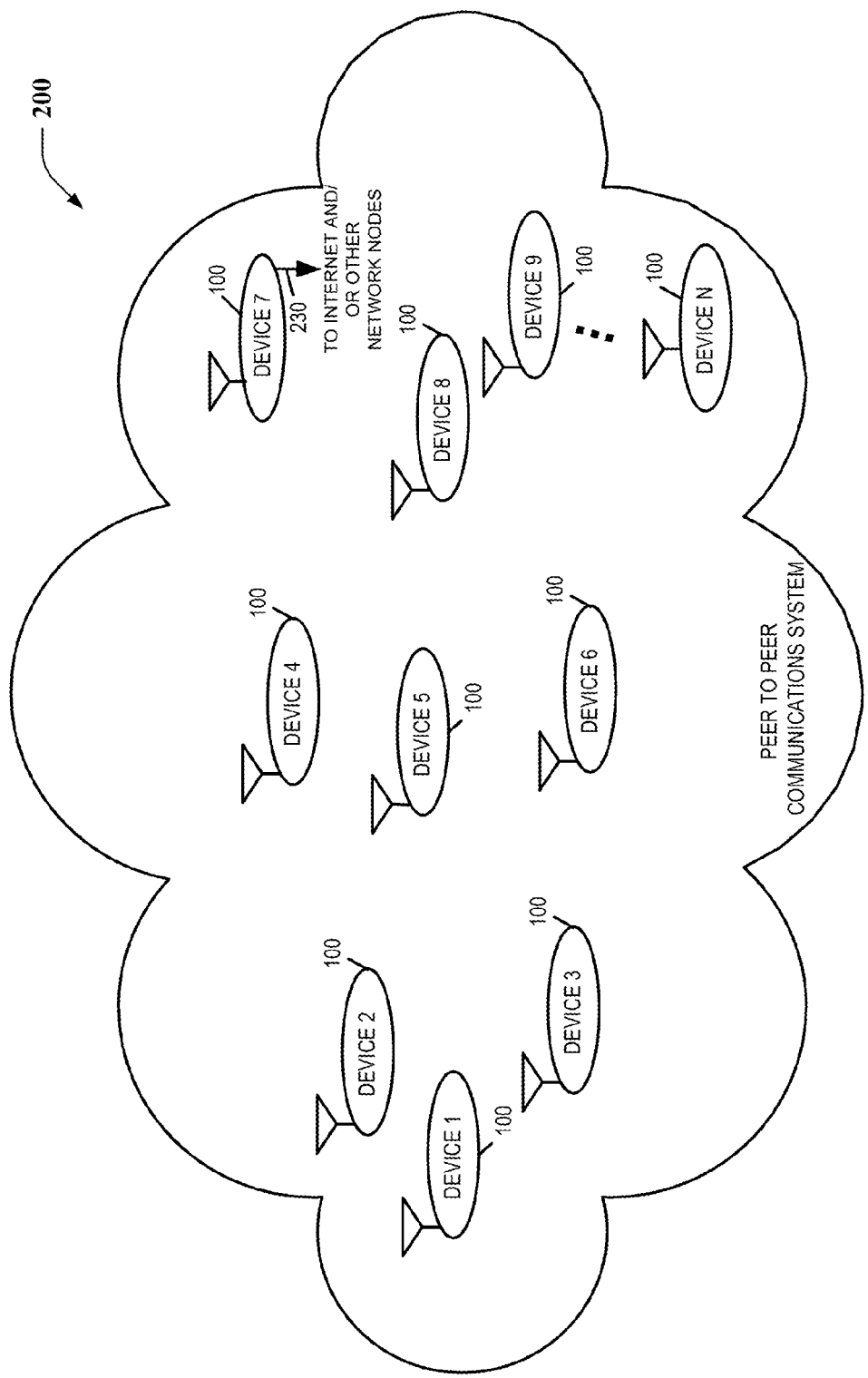
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatuses are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
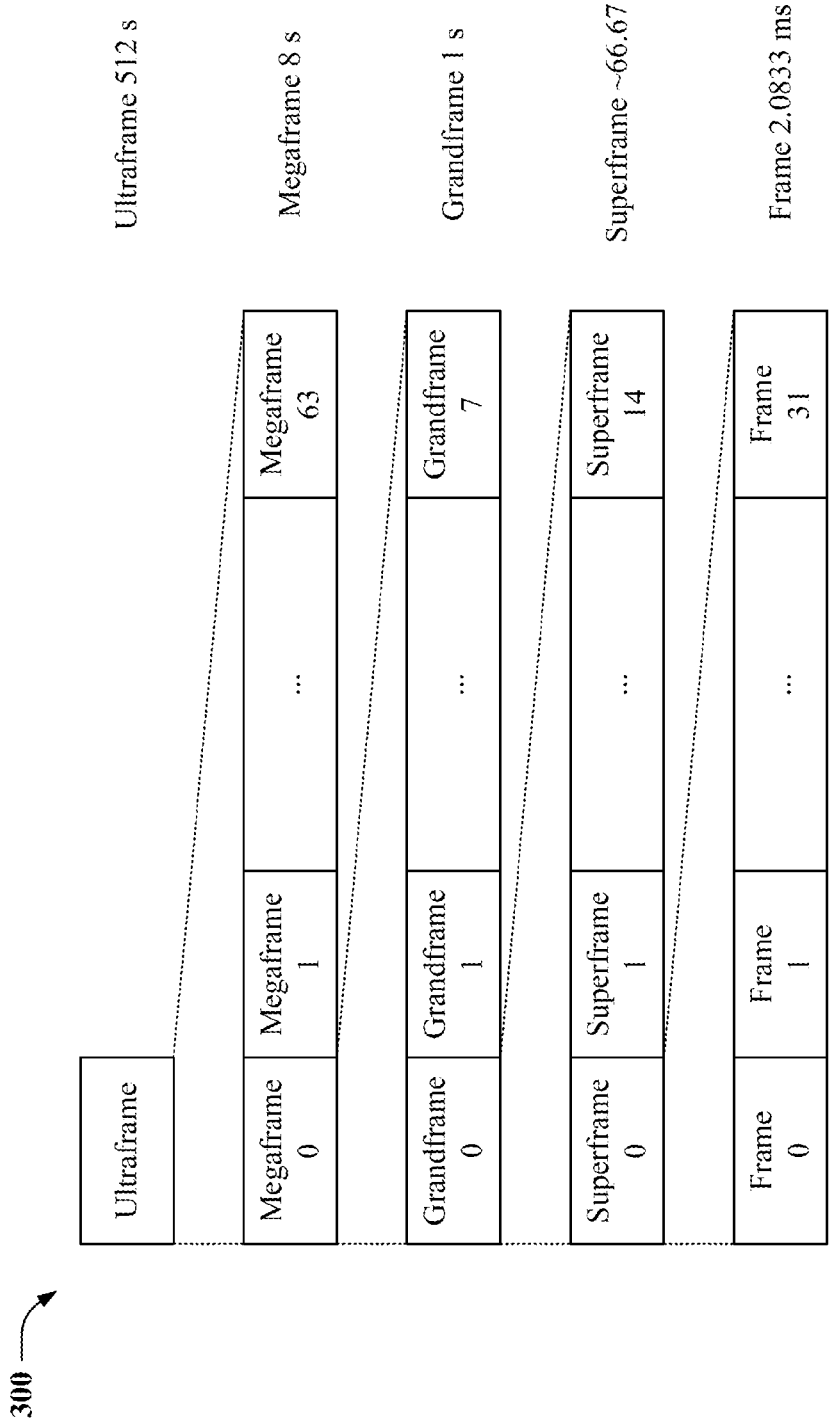
FIG. 3 is a diagram illustrating a time structure for peer-to-peer communications between the wireless communication devices.

FIG. 3 is a diagram 300 illustrating a time structure for peer-to-peer communications between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
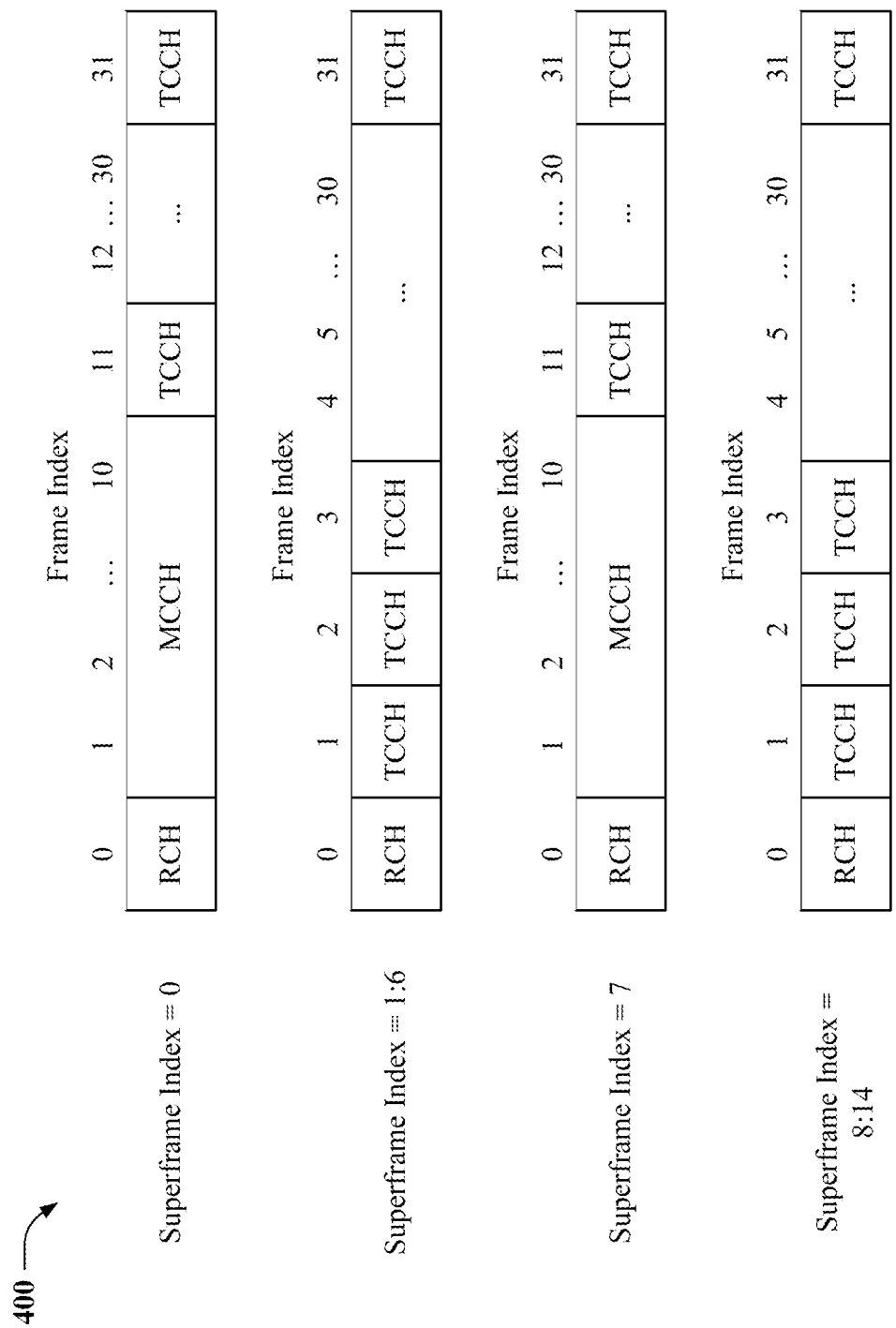
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
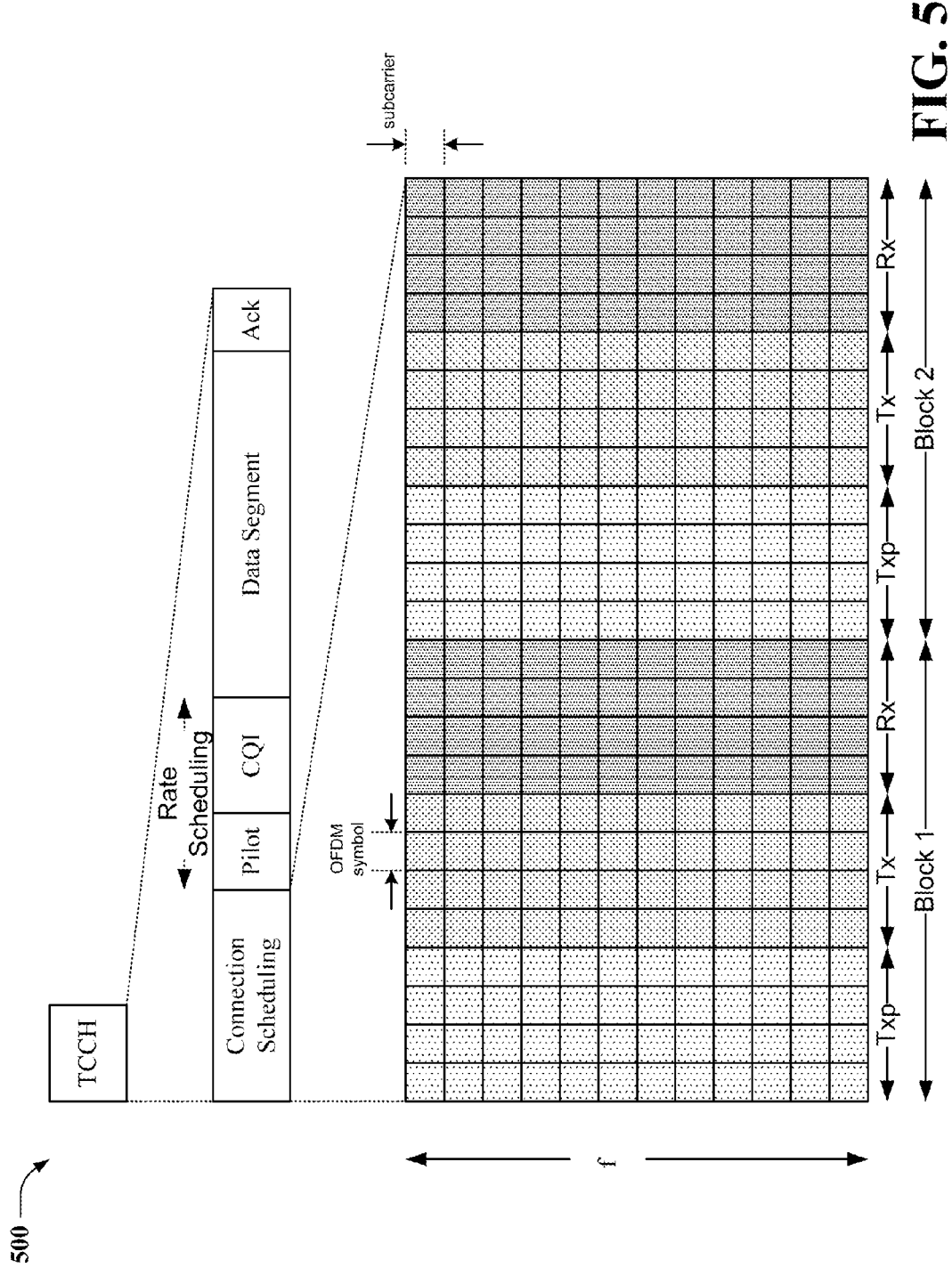
FIG. 5 is a diagram illustrating an operation timeline of a traffic channel slot and a structure of link scheduling.

FIG. 5 is a diagram 500 illustrating an operation timeline of a TCCH slot and a structure of link scheduling. As shown in FIG. 5, a TCCH slot includes four subchannels: connection scheduling, rate scheduling, a data segment, and an ACK. The rate scheduling subchannel includes a pilot segment and a CQI segment. The connection scheduling subchannel includes two blocks (Block 1 and Block 2), each of which contains a plurality of resource elements, i.e., a plurality of subcarriers in the frequency domain and OFDM orthogonal frequency divisional multiplexing (OFDM) symbols in the time domain. Each of Block 1 and Block 2 spans the plurality of subcarriers and includes four orthogonal frequency division multiplexing (OFDM) symbols in a Txp-block, four OFDM symbols in a Tx-block, and four OFDM symbols in an Rx-block. One resource element (or tone) corresponds to one subcarrier and one OFDM symbol.

Figure 6B:
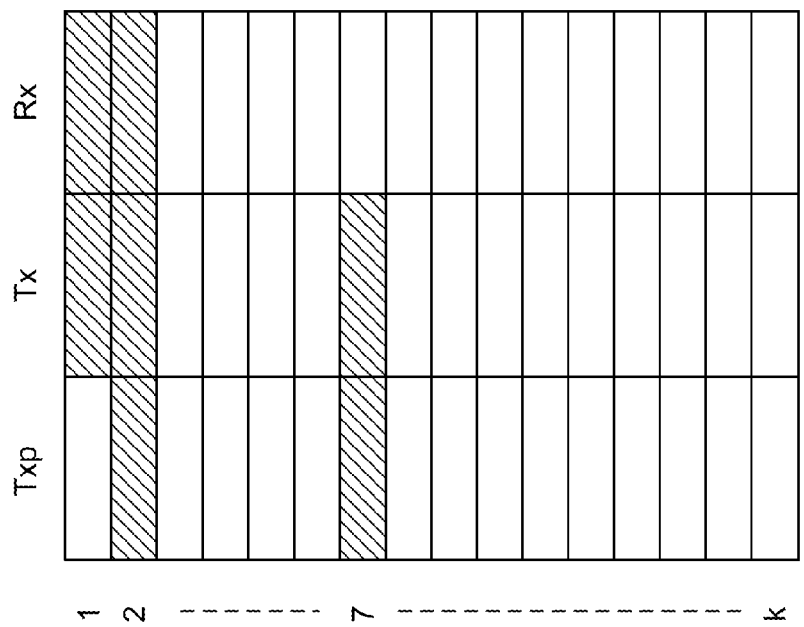
FIG. 6B is a second diagram for illustrating an exemplary connection scheduling signaling scheme for the wireless communications devices.
Figure 6A:
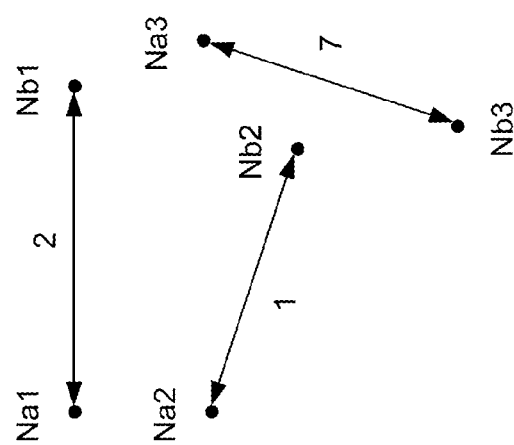
FIG. 6A is a first diagram for illustrating an exemplary connection scheduling signaling scheme for the wireless communications devices.

FIG. 6A is a first diagram for illustrating an exemplary connection scheduling signaling scheme for the wireless communications devices 100. As shown in FIG. 6A, wireless node a1 (Na1) is communicating with wireless node b1 (Nb1), wireless node a2 (Na2) is communicating with wireless node b2 (Nb2), and wireless node a3 (Na3) is communicating with wireless node b3 (Nb3). The wireless node Na1 is assumed to have transmit priority over the wireless node Nb1, the wireless node Na2 is assumed to have transmit priority over the wireless node Nb2, and the wireless node Na3 is assumed to have transmit priority over the wireless node Nb3. Each of the links has a different medium access priority depending on the particular slot for communication. For the particular slot for communication, link 1 (Na1, Nb1) is assumed to have a medium access priority of 2, link 2 (Na2, Nb2) is assumed to have a medium access priority of 1, and link 3 (Na3, Nb3) is assumed to have a medium access priority of 7.

FIG. 6B is a second diagram for illustrating an exemplary connection scheduling signaling scheme for the wireless communications devices 100. FIG. 6B shows connection scheduling resources of a block (e.g., Block 1 or Block 2 of FIG. 5) in the connection scheduling subchannel. The connection scheduling resources include a plurality of subcarriers, each of the subcarriers corresponding to one of k frequencies bands. Each of the frequency bands corresponds to a particular medium access priority. One block in the connection scheduling resources is split into three subblocks/phases: Txp, Tx, and Rx. The Txp-block is used by the higher priority node in the link to indicate whether the higher priority node will act as a transmitter or a receiver. If the higher priority node transmits on the allocated OFDM symbol in the Txp-block, the higher priority node indicates to the lower priority node an intent to act as a transmitter. If the higher priority node does not transmit on the allocated OFDM symbol in the Txp-block, the higher priority node indicates to the lower priority node an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison. The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield.

The connection scheduling signaling scheme is best described in conjunction with an example. The node Na2 has no data to transmit and does not transmit in the Txp-block for medium access priority 1, the node Na1 has data to transmit and transmits in the Txp-block for medium access priority 2, and the node Na3 has data to transmit and transmits in the Txp-block for medium access priority 7. The node Nb2 has data to transmit and transmits in the Tx-block for medium access priority 1, the node Na1 transmits in the Tx-block for medium access priority 2, and the node Na3 transmits in the Tx-block for medium access priority 7. The node Na2 listens to the tones in the Tx-blocks and determines to transmit in the Rx-block for medium access priority 1, as the node Na2 has the highest priority. The node Nb1 listens to the tones in the Tx-blocks, determines that its link would not interfere with link 2, which has a higher medium access priority, and transmits in the Rx-block for medium access priority 2. The node Nb3 listens to the tones in the Tx-blocks, determines that its link would interfere with link 1 and/or link 2, both of which have a higher medium access priority, and Rx-yields by not transmitting in the Rx-block for medium access priority 7. Subsequently, both Nb2 and Na1 listen to the tones in the Rx blocks to determine whether to transmit the data. Because Nb2 has a higher link medium access priority than Na1, Nb2 transmits its data. Na1 will Tx-yield if Na1 determines that its transmission would interfere with the transmission from Nb2.

Figure 7:
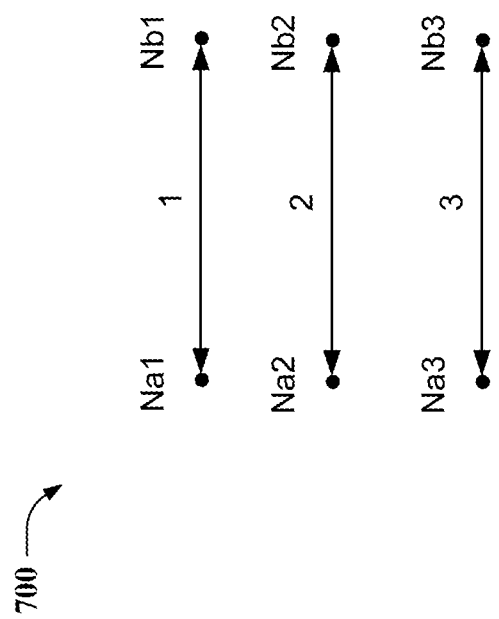
FIG. 7 is a diagram for illustrating the cascade yielding problem.

FIG. 7 is a diagram for illustrating the cascade yielding problem. As shown in FIG. 7, node Na1 is communicating with node Nb1 in a first link, node Na2 is communicating with node Nb2 in a second link, and node Na3 is communicating with node Nb3 in a third link. The first link has a medium access priority of 1, the second link has a medium access priority of 2, and the third link has a medium access priority of 3. In the cascade yielding problem, if the second link determines that it would interfere with the first link, the second link Rx-yields to the first link that has a higher medium access priority. In addition, if the third link determines it would interfere with the second link, the third link Rx-yields to the second link that has a higher medium access priority. With both the second and third links yielding, only the first link communicates in that particular traffic slot. However, assuming the third link would not interfere with the first link, both the first link and the third link could have communicated in the traffic slot without interference. As such, in the cascade yielding problem, Rx-yielding cascades among successively lower priority links and results in a link yielding to a link that itself is yielding.

Figure 8:
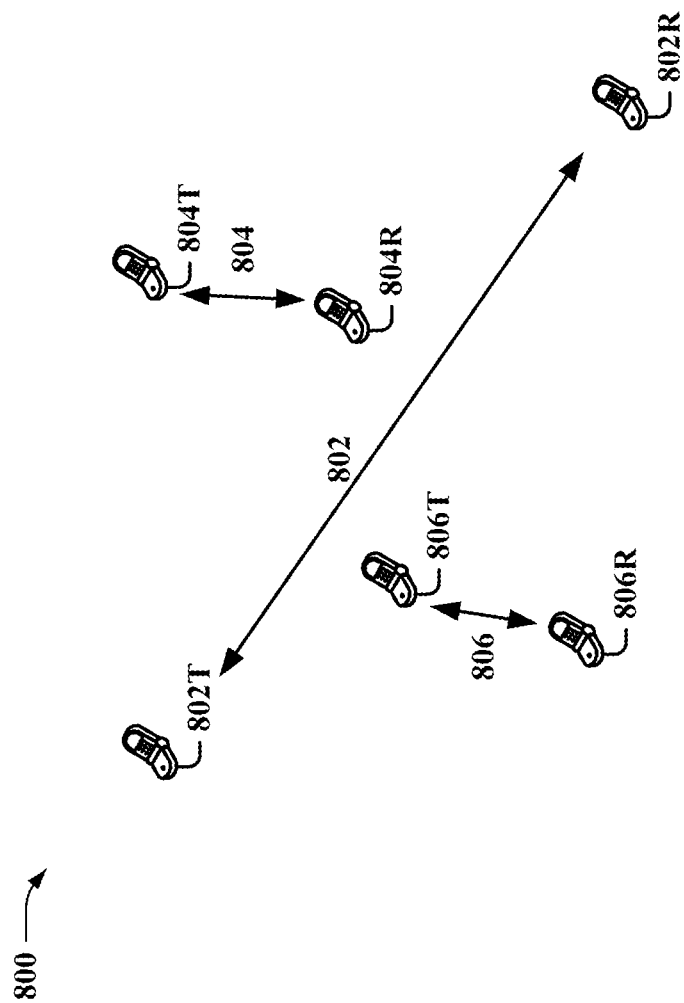
FIG. 8 is a diagram for further illustrating Rx-yielding and Tx-yielding which leads to the cascade yielding problem and for illustrating the exemplary method of preemptive backoff from transmitting in the Txp/Tx/Rx portions of link scheduling in order to address the cascade yielding problem.

FIG. 8 is a diagram 800 for further illustrating Rx-yielding and Tx-yielding which leads to the cascade yielding problem and for illustrating the exemplary method of preemptive backoff from transmitting in the Txp/Tx/Rx portions of link scheduling in order to address the cascade yielding problem. Medium access is resolved by a distributed signaling protocol due to the absence of a centralized scheduler. The wireless links 802, 804, 806 have a notion of medium access priority which often is chosen randomly (or pseudorandomly) and is broadcasted to the neighborhood. For example, as described supra, the link scheduling protocol consists of a Tx portion and a Rx portion where different links make distributed decisions on whether they should transmit in the current slot based on the signals they detected in the link scheduling. Specifically, in the Tx portion of the link scheduling, every transmitter 802T, 804T, 806T having traffic sends out a transmit request to their intended receivers 802R, 804R, 806R. If a receiver sees another transmit request from a link with higher priority and determines that the communication scheduled for that link is going to interfere with the communication from its intended transmitter, the receiver yields (i.e., Rx yields) the current transmission slot by not transmitting back a transmit request response signal in the corresponding Rx block. In the Rx block, each receiver not yielding responds back with a transmit request response signal. The transmitters observe the transmit request response signals and if there is a transmit request response signal from a link with higher priority and yet with strong power, the transmitter yields (i.e., Tx yields) the current transmission slot by not sending out the data transmission. As such, when a node 802T/R, 804T/R, 806T/R receives a medium access request from another node in a higher priority link contending for the same resource (e.g., time, frequency band), the node backs off from accessing the resources through Rx and Tx yielding. Rx and Tx yielding leads to the cascade yielding problem.

Due to geographic/data-rate constraints, the contention set (i.e., the set of links that complete for the same resource) is different for each link and while the links in the contention set of a link contend for resources with that link, they do not necessarily contend with each other. For example, as shown in FIG. 8, consider a network with a long link 802 and short links 804, 806. The long link 802 contends with the short links 804, 806 for the medium access. But the short links 802, 804 can use the medium simultaneously.

In such scenarios, the medium access protocol described supra can cause throughput loss in the system. Assume that the long link 802 has a low level priority in medium access and broadcasts the transmit request signal along with the priority in the Tx portion of the link scheduling. The long link 802 will likely yield the current transmission slot to the short links 802, 804 with a higher medium access priority. Even if the long link 802 has a higher medium access priority, such as for example, a medium to low level priority in medium access, the probability that the long link 802 will yield to the short links increases as the set of links contending for the same resources as the long link 802 increases. That is, as the contention set for the long link 802 increases, the probability of the links in the contention set having lower medium access priority than the long link is low. Therefore, with a high probability, at least one of the short links can make the long link 802 yield either through the receive yielding or the transmit yielding protocol. Furthermore, even if the long link 802 does not get the medium, the high rate short links 804, 806, which could access the medium simultaneously, may back off due to the cascade yielding problem because they have lower priority than the long link 802.

As such, a method of preemptive back off that alleviates the aforementioned problem and increases the system throughput is provided. In the method of preemptive backoff, a node preemptively backs off from transmitting in the Txp or Tx portions of link scheduling, or in the Rx portions of link scheduling without being required to backoff through Rx yielding. Clearly, preemptive backoff of transmitting in the Txp/Tx portions of link scheduling is different from backing off from transmitting in the Rx portions of link scheduling through Rx yielding and backing off from sending a data transmission through Tx yielding. Preemptive backoff of transmitting in the Rx portions of link scheduling is also different from backing off from transmitting in the Rx portions of link scheduling through Rx yielding. That is, preemptive backoff from transmitting in the Rx block occurs when a receiver determines to backoff off from transmitting in the Rx block when not necessarily being required to backoff from transmitting through Rx yielding. That is, if a receiver determines from the signals received in the broadcasted Txp and Tx blocks that its communication with its communication peer would not interfere with other links, the receiver will not Rx-yield by backing off from transmitting in the Rx block. However, the receiver may nevertheless determine to preemptively backoff from transmitting in the Rx block in order to alleviate or otherwise address the cascade yielding problem.

Assume the set of wireless devices 802T/R, 804T/R, and 806T/R share the same resource. Each wireless device has a contention subset, i.e., the subset of the wireless devices with which the wireless device cannot share the resource simultaneously. These subsets are not known to all the wireless devices. The access to the resource is based on randomized priorities of the wireless devices which are broadcast to all the wireless devices.

In the exemplary method of preemptive backoff, each wireless device either knows the size of its own contention subset for a particular resource or determines the size of its contention subset. A wireless device may estimate the size of its contention subset through an estimation based on a distance from a communication peer with which the wireless device is communicating or by monitoring the priority broadcasts and performing necessary measurements. The estimate can be time varying. In addition, each wireless device determines its medium access priority in the current time slot. Subsequently, each wireless device determines whether to transmit a scheduling control signal (e.g., a transmission request (Txp or Tx) or transmission response request (Rx)) in the current time slot based on the size of the contention subset and the medium access priority.

As such, according to the exemplary method, a wireless device may determine not to send a transmission request (Txp or Tx), even though the wireless device wants to use the resource. Furthermore, according to the exemplary method, a wireless device may determine not to send a transmission response request (Rx) even when the wireless device is not forced to yield through Rx yielding. As such, a wireless device may decide not to broadcast its priority and to back off from contending for the resource based on its priority and its estimate of the size of its contention subset (i.e., number of competitors). In the context of an example, referring again to FIG. 7, using the exemplary method, link 2 may determine to preemptively backoff from transmitting in the Txp/Tx blocks and therefore link 3, which would have Rx-yielded otherwise to link 2, will not Rx-yield to link 2. The preemptive backoff of link 2 therefore allows link 1 and link 3 to communicate concurrently and therefore alleviates the cascade yielding problem.

The decision to back off may be threshold based, probabilistic, or deterministic. In one configuration, if the priority of a wireless device is below a threshold, the wireless device back off preemptively. The threshold may be a function of the size of the contention subset. Alternatively, when the size of the contention subset is greater than a threshold and the priority is in a lower subset of priorities (e.g., 5%, 10%, or 20%) for transmission in a particular timeslot, the wireless node determines that it will not try to utilize the timeslot (transmit on the Txp/Tx/Rx phases of the timeslot) even though the wireless device has data to transmit. In another configuration, a wireless device may backoff preemptively for a deterministic fraction of time. The fraction may be a function of the size of the contention subset.

In yet another configuration, a wireless device backs off preemptively with a certain probability. The probability may be a function of the priority and the size of the contention subset. As such, a wireless device may determine a probability $P(D,K)$ that is a function of the number of competitors D and its priority K. The wireless node may then determine to transmit a scheduling control signal with probability equal to $1-P$. The probability P of not transmitting a scheduling control signal increases as the number of competitors D increases and as the priority K decreases. In an example, if there are 10 competitors (D=10) for a wireless device and a priority K for the wireless device is in a lower subset of priorities of 5%, the wireless device may determine the probability P to equal 80% and therefore will transmit a scheduling control signal with a probability equal to 20% when the wireless device has data to transmit or to receive.

In one configuration, the probability P of preemptively backing off from transmitting a scheduling control signal may be determined as $$P=1, \text{ if } (1-(K-1)/N)^D < \Delta, \text{ and } P=0, \text{ otherwise,} \qquad \text{Eq. 1}$$

where P is the probability of preemptively backing off from transmitting a scheduling control signal, N is the number of priorities, K is the priority of the wireless device in which $K \in [1, \ldots, N]$, D is the number of competitors in which $D \in [1, \ldots, N]$, and $\Delta$ is a threshold which may be equal to 0.01.

In wireless networks, the resources can be time, frequency, or a time-frequency unit. While having a wireless device backoff preemptively from communication can theoretically cause a decrease in system throughput (e.g., when the wireless device that backed off would not have caused any interference), the backoff probability P can be adjusted so that the overall system throughput is increased. Accordingly, Eq. 1 may be varied in order to maximize overall system throughput.

In another configuration, the probability P may also be a function of priorities of other wireless nodes in the contention subset. A wireless device may be able to predict the priorities of other contending wireless devices from previous priorities. Such a probability may be used for preemptive backoff of either the transmission request signal (Txp/Tx) or the transmission response request (Rx). If such a probability P is used to determine the backoff probability of transmitting a transmission request response signal (Rx), the probability P may be a function of priorities of only those wireless nodes in the contention subset that have data to transmit/receive, as a wireless node may be able to determine which of those contending wireless nodes have data to transmit/receive from the signals transmitted in the Txp and Tx phases in the connection scheduling.

Figure 9:
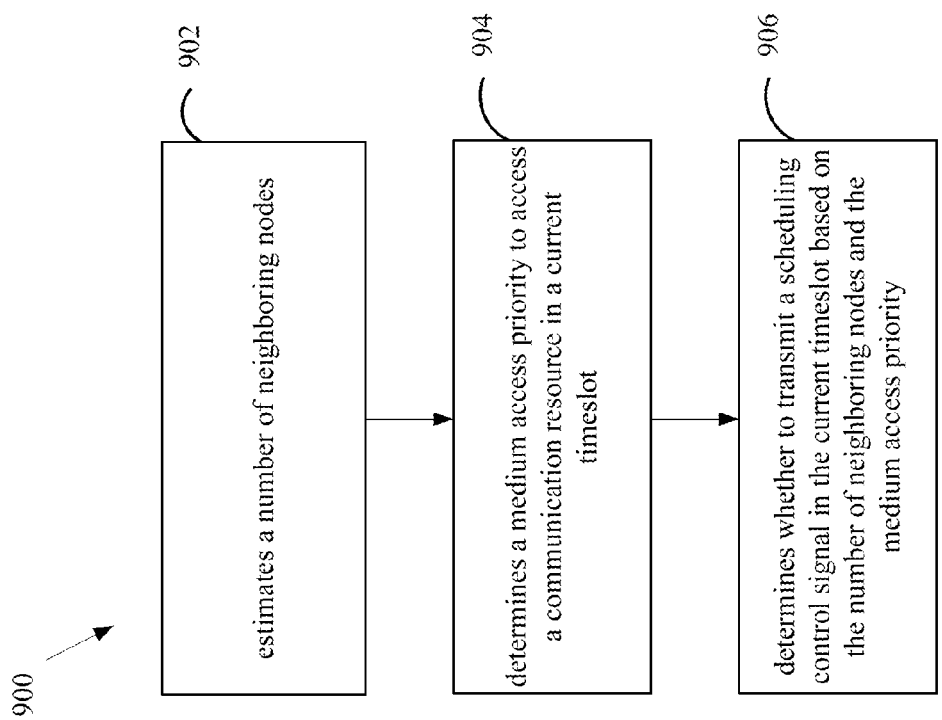
FIG. 9 is a flow chart of a method of wireless communication.

FIG. 9 is a flow chart 900 of an exemplary method of addressing the cascade yielding problem in a wireless device. The wireless device estimates a number of neighboring nodes (902). In addition, the wireless device determines a medium access priority to access a communication resource in a current timeslot (904). Subsequently, the wireless device determines whether to transmit a scheduling control signal in the current timeslot based on the number of neighboring nodes and the medium access priority (906). In one configuration, the neighboring nodes are nodes whose simultaneous transmission in the communication resource is interfering with or being interfered by the wireless device. The number of neighboring nodes may be estimated based on a distance from a communication peer. Alternatively, the wireless device may monitor a wireless medium to estimate the number of neighboring nodes. In one configuration, the monitoring is in at least one of a transmission request (Txp or Tx), a transmission request response (Rx), a data transmission, or paging transmission. The wireless device may measure energy in the wireless medium from a plurality of nodes and compare the measured energy to an energy threshold to determine a set of neighboring nodes within the plurality of nodes with an energy higher than the energy threshold. In one configuration, the wireless device receives signals from a plurality of nodes and determines the neighboring nodes based on the received signals.

In one configuration, the medium access priority is a function of at least one of a link identification (cell ID), a node ID, or a current timeslot index. The medium access priority may be a pseudorandom number. In one configuration, the wireless device determines a value based on the number of neighboring nodes and the medium access priority and the wireless device determines whether to transmit the scheduling control signal based on a comparison of the value with a threshold. Such a configuration was discussed supra in relation to Eq. 1. The wireless device may determine a probability based on the number of neighboring nodes and the medium access priority. The wireless device may determine whether to transmit the scheduling control signal (Txp/Tx/Rx) based on the probability. In one configuration, the wireless device determines medium access priorities of the neighboring nodes in the current timeslot and the wireless device determines whether to transmit the scheduling control signal based on the determined medium access priorities of the neighboring nodes. The scheduling control signal is one of a transmission request (Txp/Tx) or a transmission request response (Rx).

Figure 10:
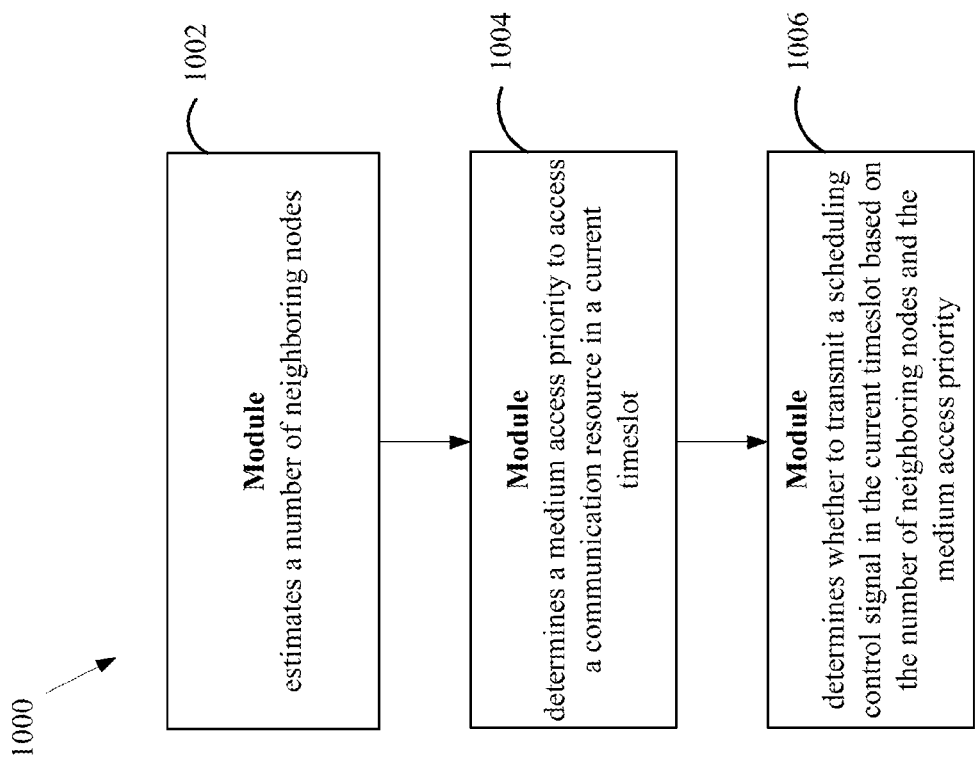
FIG. 10 is a conceptual block diagram illustrating the functionality of an exemplary apparatus.

FIG. 10 is a conceptual block diagram 1000 illustrating the functionality of an exemplary apparatus 100. The apparatus 100 includes a module 1002 that estimates a number of neighboring nodes. In addition, the apparatus 100 includes a module 1004 that determines a medium access priority to access a communication resource in a current timeslot. Furthermore, the apparatus 100 includes a module 1006 that determines whether to transmit a scheduling control signal in the current timeslot based on the number of neighboring nodes and the medium access priority.

Referring to FIG. 1, in one configuration, the apparatus 100 for wireless communication includes means for estimating a number of neighboring nodes, means for determining a medium access priority to access a communication resource in a current timeslot, and means for determining whether to transmit a scheduling control signal in the current timeslot based on the number of neighboring nodes and the medium access priority. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
estimating a number of neighboring nodes;
determining a medium access priority to access a communication resource in a current timeslot; and
preemptively backing off from transmitting a scheduling control signal in the current timeslot based on the number of neighboring nodes and the medium access priority, the control signal corresponding to a request by the wireless device to contend for the resource.

2. The method of claim 1, wherein the neighboring nodes are nodes whose simultaneous transmission in the communication resource is interfering with or being interfered by the wireless device.

3. The method of claim 1, wherein the number of neighboring nodes is estimated based on a distance from a communication peer.

4. The method of claim 1, further comprising monitoring a wireless medium to estimate the number of neighboring nodes.

5. The method of claim 4, wherein the monitoring is in at least one of a transmission request, a transmission request response, data, or paging.

6. The method of claim 1, further comprising:
measuring energy in the wireless medium from a plurality of nodes; and
comparing the measured energy to an energy threshold to determine a set of neighboring nodes within the plurality of nodes with an energy higher than the energy threshold.

7. The method of claim 1, further comprising:
receiving signals from a plurality of nodes; and
determining the neighboring nodes based on the received signals.

8. The method of claim 1, wherein the medium access priority is a function of at least one of a link identification, a node identification, and a current timeslot index.

9. A method of operating a wireless device, comprising:
estimating a number of neighboring nodes;
determining a medium access priority to access a communication resource in a current timeslot; and
determining whether to transmit a scheduling control signal in the current timeslot based on the number of neighboring nodes and the medium access priority, wherein the medium access priority is a pseudorandom number.

10. A method of operating a wireless device, comprising:
estimating a number of neighboring nodes;
determining a medium access priority to access a communication resource in a current timeslot;
determining whether to transmit a scheduling control signal in the current timeslot based on the number of neighboring nodes and the medium access priority; and
determining a value based on the number of neighboring nodes and the medium access priority and wherein the determining whether to transmit the scheduling control signal is further based on a comparison of the value with a threshold.

11. A method of operating a wireless device, comprising:
estimating a number of neighboring nodes;
determining a medium access priority to access a communication resource in a current timeslot;
determining whether to transmit a scheduling control signal in the current timeslot based on the number of neighboring nodes and the medium access priority; and
determining a probability based on the number of neighboring nodes and the medium access priority and wherein the determining whether to transmit the scheduling control signal is based on the probability.

12. The method of claim 1, further comprising determining medium access priorities of the neighboring nodes in the current timeslot, wherein the determining whether to transmit the scheduling control signal is further based on the determined medium access priorities of the neighboring nodes.

13. The method of claim 1, wherein the scheduling control signal is one of a transmission request or a transmission request response.

14. An apparatus for wireless communication, comprising:
means for estimating a number of neighboring nodes;
means for determining a medium access priority to access a communication resource in a current timeslot; and
means for preemptively backing off from transmitting a scheduling control signal in the current timeslot based on the number of neighboring nodes and the medium access priority, the control signal corresponding to a request by the apparatus to contend for the resource.

15. The apparatus of claim 14, wherein the neighboring nodes are nodes whose simultaneous transmission in the communication resource is interfering with or being interfered by the apparatus.

16. The apparatus of claim 14, wherein the number of neighboring nodes is estimated based on a distance from a communication peer.

17. The apparatus of claim 14, further comprising means for monitoring a wireless medium to estimate the number of neighboring nodes.

18. The apparatus of claim 17, wherein the monitoring is in at least one of a transmission request, a transmission request response, data, or paging.

19. The apparatus of claim 14, further comprising:
means for measuring energy in the wireless medium from a plurality of nodes; and
means for comparing the measured energy to an energy threshold to determine a set of neighboring nodes within the plurality of nodes with an energy higher than the energy threshold.

20. The apparatus of claim 14, further comprising:
means for receiving signals from a plurality of nodes; and
means for determining the neighboring nodes based on the received signals.

21. The apparatus of claim 14, wherein the medium access priority is a function of at least one of a link identification, a node identification, and a current timeslot index.

22. An apparatus for wireless communication, comprising:
means for estimating a number of neighboring nodes;
means for determining a medium access priority to access a communication resource in a current timeslot; and
means for determining whether to transmit a scheduling control signal in the current timeslot based on the number of neighboring nodes and the medium access priority, wherein the medium access priority is a pseudorandom number.

23. An apparatus for wireless communication, comprising:
means for estimating a number of neighboring nodes;
means for determining a medium access priority to access a communication resource in a current timeslot;
means for determining whether to transmit a scheduling control signal in the current timeslot based on the number of neighboring nodes and the medium access priority; and
means for determining a value based on the number of neighboring nodes and the medium access priority and wherein the means for determining whether to transmit the scheduling control signal is further based on a comparison of the value with a threshold.

24. An apparatus for wireless communication, comprising:
means for estimating a number of neighboring nodes;
means for determining a medium access priority to access a communication resource in a current timeslot;
means for determining whether to transmit a scheduling control signal in the current timeslot based on the number of neighboring nodes and the medium access priority; and
means for determining a probability based on the number of neighboring nodes and the medium access priority and wherein the means for determining whether to transmit the scheduling control signal is based on the probability.

25. The apparatus of claim 14, further comprising means for determining medium access priorities of the neighboring nodes in the current timeslot, wherein the means for determining whether to transmit the scheduling control signal is further based on the determined medium access priorities of the neighboring nodes.

26. The apparatus of claim 14, wherein the scheduling control signal is one of a transmission request or a transmission request response.

27. A non-transitory computer-readable medium in a wireless device, the medium encoded with a computer program comprising code for:
   estimating a number of neighboring nodes;
   determining a medium access priority to access a communication resource in a current timeslot; and
   preemptively backing off from transmitting a scheduling control signal in the current timeslot based on the number of neighboring nodes and the medium access priority, the control signal corresponding to a request by the wireless device to contend for the resource.

28. The computer-readable medium of claim 27, wherein the neighboring nodes are nodes whose simultaneous transmission in the communication resource is interfering with or being interfered by the wireless device.

29. The computer-readable medium of claim 27, wherein the number of neighboring nodes is estimated based on a distance from a communication peer.

30. The computer-readable medium of claim 27, wherein the computer program further comprises code for monitoring a wireless medium to estimate the number of neighboring nodes.

31. The computer-readable medium of claim 30, wherein the code for monitoring monitors at least one of a transmission request, a transmission request response, data, or paging.

32. The computer-readable medium of claim 27, wherein the computer program further comprises code for:
   measuring energy in the wireless medium from a plurality of nodes; and
   comparing the measured energy to an energy threshold to determine a set of neighboring nodes within the plurality of nodes with an energy higher than the energy threshold.

33. The computer-readable medium of claim 27, wherein the computer program further comprises code for:
   receiving signals from a plurality of nodes; and
   determining the neighboring nodes based on the received signals.

34. The computer-readable medium of claim 27, wherein the medium access priority is a function of at least one of a link identification, a node identification, and a current timeslot index.

35. A non-transitory computer-readable medium in a wireless device, the medium encoded with a computer program comprising code for:
   estimating a number of neighboring nodes;
   determining a medium access priority to access a communication resource in a current timeslot; and
   determining whether to transmit a scheduling control signal in the current timeslot based on the number of neighboring nodes and the medium access priority, wherein the medium access priority is a pseudorandom number.

36. A non-transitory computer-readable medium in a wireless device, the medium encoded with a computer program comprising code for:
   estimating a number of neighboring nodes;
   determining a medium access priority to access a communication resource in a current timeslot; and
   determining whether to transmit a scheduling control signal in the current timeslot based on the number of neighboring nodes and the medium access priority, wherein the computer-readable medium further comprises code for determining a value based on the number of neighboring nodes and the medium access priority and wherein the code for determining whether to transmit the scheduling control signal makes the determination based on a comparison of the value with a threshold.

37. A non-transitory computer-readable medium in a wireless device, the medium encoded with a computer program comprising code for:
   estimating a number of neighboring nodes;
   determining a medium access priority to access a communication resource in a current timeslot; and
   determining whether to transmit a scheduling control signal in the current timeslot based on the number of neighboring nodes and the medium access priority, wherein the computer-readable medium further comprises code for determining a probability based on the number of neighboring nodes and the medium access priority and wherein the code for determining whether to transmit the scheduling control signal makes the determination based on the probability.

38. The computer-readable medium of claim 27, wherein the computer program further comprises code for determining medium access priorities of the neighboring nodes in the current timeslot, wherein the code for determining whether to transmit the scheduling control signal makes the determination based on the determined medium access priorities of the neighboring nodes.

39. The computer-readable medium of claim 27, wherein the scheduling control signal is one of a transmission request or a transmission request response.

40. An apparatus for wireless communication, comprising:
   a processing system configured to:
      estimate a number of neighboring nodes;
      determine a medium access priority to access a communication resource in a current timeslot; and
      preemptively back off from transmitting a scheduling control signal in the current timeslot based on the number of neighboring nodes and the medium access priority, the control signal corresponding to a request by the apparatus to contend for the resource.

41. The apparatus of claim 40, wherein the neighboring nodes are nodes whose simultaneous transmission in the communication resource is interfering with or being interfered by the apparatus.

42. The apparatus of claim 40, wherein the number of neighboring nodes is estimated based on a distance from a communication peer.

43. The apparatus of claim 40, wherein the processing system is further configured to monitor a wireless medium to estimate the number of neighboring nodes.

44. The apparatus of claim 43, wherein the processing system is configured to monitor at least one of a transmission request, a transmission request response, data, or paging.

45. The apparatus of claim 40, wherein the processing system is further configured to:
   measure energy in the wireless medium from a plurality of nodes; and
   compare the measured energy to an energy threshold to determine a set of neighboring nodes within the plurality of nodes with an energy higher than the energy threshold.

46. The apparatus of claim 40, wherein the processing system is further configured to:
   receive signals from a plurality of nodes; and
   determine the neighboring nodes based on the received signals.

47. The apparatus of claim 40, wherein the medium access priority is a function of at least one of a link identification, a node identification, and a current timeslot index.

48. An apparatus for wireless communication, comprising:
a processing system configured to:
estimate a number of neighboring nodes;
determine a medium access priority to access a communication resource in a current timeslot; and
determine whether to transmit a scheduling control signal in the current timeslot based on the number of neighboring nodes and the medium access priority, wherein the medium access priority is a pseudorandom number.

49. An apparatus for wireless communication, comprising:
a processing system configured to:
estimate a number of neighboring nodes;
determine a medium access priority to access a communication resource in a current timeslot; and
determine whether to transmit a scheduling control signal in the current timeslot based on the number of neighboring nodes and the medium access priority, wherein the processing system is further configured to determine a value based on the number of neighboring nodes and the medium access priority and wherein the processing system is configured to determine whether to transmit the scheduling control signal based on a comparison of the value with a threshold.

50. An apparatus for wireless communication, comprising:
a processing system configured to:
estimate a number of neighboring nodes;
determine a medium access priority to access a communication resource in a current timeslot; and
determine whether to transmit a scheduling control signal in the current timeslot based on the number of neighboring nodes and the medium access priority, wherein the processing system is further configured to determine a probability based on the number of neighboring nodes and the medium access priority and wherein the processing system is configured to determine whether to transmit the scheduling control signal based on the probability.

51. The apparatus of claim 40, wherein the processing system is further configured to determine medium access priorities of the neighboring nodes in the current timeslot, wherein the processing system is configured to determine whether to transmit the scheduling control signal based on the determined medium access priorities of the neighboring nodes.

52. The apparatus of claim 40, wherein the scheduling control signal is one of a transmission request or a transmission request response.

* * * * *